United States Patent
Emilianowicz et al.

(10) Patent No.: US 6,449,952 B1
(45) Date of Patent: Sep. 17, 2002

(54) REMOVABLE COWL FOR GAS TURBINE COMBUSTOR

(75) Inventors: Edward John Emilianowicz, West Chester, OH (US); James Michael Caldwell, Alexandria, KY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/836,037

(22) Filed: Apr. 17, 2001

(51) Int. Cl.[7] .................. F02C 7/20; F02C 3/14
(52) U.S. Cl. ............... 60/772; 60/798; 60/796; 60/752
(58) Field of Search ............ 60/772, 798, 796, 60/800, 752, 746, 747

(56) References Cited

U.S. PATENT DOCUMENTS

| | | | |
|---|---|---|---|
| 4,195,476 A | * 4/1980 | Wood | 60/800 |
| 5,181,377 A | 1/1993 | Napoli et al. | |
| 5,237,820 A | 8/1993 | Kastl et al. | |
| 5,239,832 A | * 8/1993 | Koshoffer et al. | 60/756 |
| 5,285,635 A | 2/1994 | Savelli et al. | |
| 5,289,687 A | 3/1994 | Kress et al. | |
| 5,524,430 A | * 6/1996 | Mazeaud et al. | 60/752 |
| 5,924,288 A | 7/1999 | Fortuna et al. | |
| 6,148,600 A | 11/2000 | Farmer et al. | |

* cited by examiner

*Primary Examiner*—Ted Kim
(74) *Attorney, Agent, or Firm*—Sonnenschein Nath & Rosenthal (57) ABSTRACT

A cowl for directing flow of air entering an annular combustor assembly of a gas turbine engine and which is removable from the combustor without disassembling the combustor. The cowl is annular in shape and has a plurality of circumferentially spaced fastener holes for receiving fasteners which commonly connect and align the cowl, an annular dome, and a liner. At least one notch is in the cowl, each notch being sized sufficiently larger than a corresponding fastener to permit the cowl to be moved to or removed from an operative position while the corresponding fastener remains in position for connecting the dome and liner to one another.

19 Claims, 6 Drawing Sheets

REMOVABLE COWL FOR GAS TURBINE COMBUSTOR

BACKGROUND OF THE INVENTION

The present invention relates generally to combustors of aircraft gas turbine engines, and in particular to a cowl for an annular combustor which may be removed and replaced while components of the combustor remain assembled.

In a gas turbine engine, pressurized air is provided from a compressor to the combustor where it is mixed with fuel and burned. One type of combustor in widespread use is arranged in an annular configuration, where flame is contained in a hollow combustion chamber defined by co-annular inner and outer liners, with an annular dome plate interconnecting the liners at their upstream ends. The dome plate, referred to as a dome, contains a plurality of circumferentially spaced carbureting assemblies for mixing fuel and air and introducing the mixture into the chamber. Flow of pressurized air into the combustor is typically regulated by a fixed cowl which is mounted on the combustor in position upstream of the dome, where it defines an area across the entrance of the dome which is open to flow. The cowl divides air into a central stream which enters the carbureting assemblies and cooling streams which flow along the inner and outer liners to protect the combustor and turbine from heat damage. The cowl may include two separate annular rings, such as radially inner and outer cowls, or it may be formed in one piece.

The cowl, dome, inner liner, and outer liner are separate piece components which are assembled together with a set of circumferentially-spaced fasteners. The components are made separate to improve repairability and maintainability. Typically each fastener simultaneously connects three of the components, extending through commonly-aligned fastener holes in the cowl, dome, and one of the two liners.

Assembly of the combustor components is a detailed, time-consuming process because of the need for precision. Relative angles and spacing between the dome and the inner and outer liners are critical parameters that must be controlled to a close tolerance. Deviations from intended dimensions can produce variations in flame location and cooling stream effectiveness that decrease combustion performance and component durability. Accordingly, when the combustor is initially assembled, special tooling is required to establish precise dimensional control and proper relative positioning between the dome and liners. Such tooling is expensive and not widely available.

Unfortunately with current design approaches, when a cowl is removed for maintenance or replacement, its removal requires full disassembly of the combustor. The entire set of fasteners must be removed to separate the cowl from the remainder of the assembled combustor. Thus, when the fasteners are removed in order to replace a cowl, the dome and liners are freed from the assembly and their precise dimensional relations are lost. Reassembly requires that the parts be shipped to a facility having adequate special tooling. These steps are time-consuming and expensive.

SUMMARY OF THE INVENTION

A cowl according to the present invention directs flow of air entering a combustor of a gas turbine engine and is removable from the combustor without disassembling the combustor. The combustor has an annular, hollow chamber defined by an annular dome at an upstream end of the chamber, an inner liner extending downstream of the dome at a radially inner side of the chamber, an outer liner extending downstream of the dome at a radially outer side of the chamber, and a plurality of fasteners for attaching the dome, inner liner, and outer liner in an assembled condition. The dome has a plurality of circumferentially spaced first fastener holes, and the inner and outer liner each having a plurality of circumferentially spaced second fastener holes generally alignable with the first fastener holes forming pairs of first and second holes for receiving the fasteners. The cowl comprises an annular cowl body for guiding flow of air entering the combustor. A mounting rim on the cowl body attaches the cowl to the combustor in an operative position wherein the cowl body extends upstream of the dome. The mounting rim has a plurality of circumferentially spaced third fastener holes generally corresponding with the pairs of first and second holes. The third fastener holes are alignable with the corresponding pairs in the operative position to receive the fasteners commonly and simultaneously through first, second, and third fastener holes. At least one notch is in the mounting rim having an edge defining the notch and an open mouth. The notch is sized larger than a third fastener hole and configured such that when the cowl is in the operative position, the notch is aligned with a corresponding pair of first and second fastener holes. The edge of the notch is spaced outwardly from the holes such that one of the fasteners is receivable in the pair of first and second holes without engaging the mounting rim. The notch allows the cowl to be installed on or removed from the operative position while the dome, inner liner, and outer liner are held in the assembled condition.

In another aspect, a combustor assembly according to the present invention is for a gas turbine engine. The combustor comprises a hollow combustion chamber generally annular in shape and defined by a forward annular dome and a liner downstream of the dome. A plurality of fasteners extend through aligned holes in the dome and liner for connecting the dome and liner at circumferentially spaced locations. A cowl body having a generally uniform annular shape is mountable on the dome and liner at a mounted position. The cowl body has a plurality of circumferentially spaced fastener holes extending therethrough generally corresponding to the aligned holes in the dome and liner for receiving the fasteners to connect the cowl body to the dome and liner. At least one notch in the cowl body is sized sufficiently larger than a corresponding at least one fastener to permit the cowl body to be moved to or removed from the mounted position while the at least one corresponding fastener remains in position for connecting the dome and liner to one another.

In still a further aspect, a method according to the present invention removes a cowl from a combustor assembly of a gas turbine engine while the combustor remains assembled. The combustor has an annular, hollow chamber defined by a dome at an upstream end of the chamber, an inner liner extending downstream of the dome at a radially inner side of the chamber, and an outer liner extending downstream of the dome at a radially outer side of the chamber. The cowl is mountable on the combustor assembly in an operative position for regulating flow of air entering the chamber with a first set of fasteners commonly and simultaneously extending through aligned fastener holes in the cowl, dome, and one of the liners. The combustor assembly has a second set of fasteners extending through aligned fastener holes in the dome and one of the liners and free from engagement with the cowl. The second set of fasteners is generally aligned with notches formed in the cowl. The method comprising the steps of removing the first set of fasteners while leaving the second set of fasteners in place, and separating the cowl from the combustor assembly while the second set of fasteners holds the dome and liner connected to one another.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
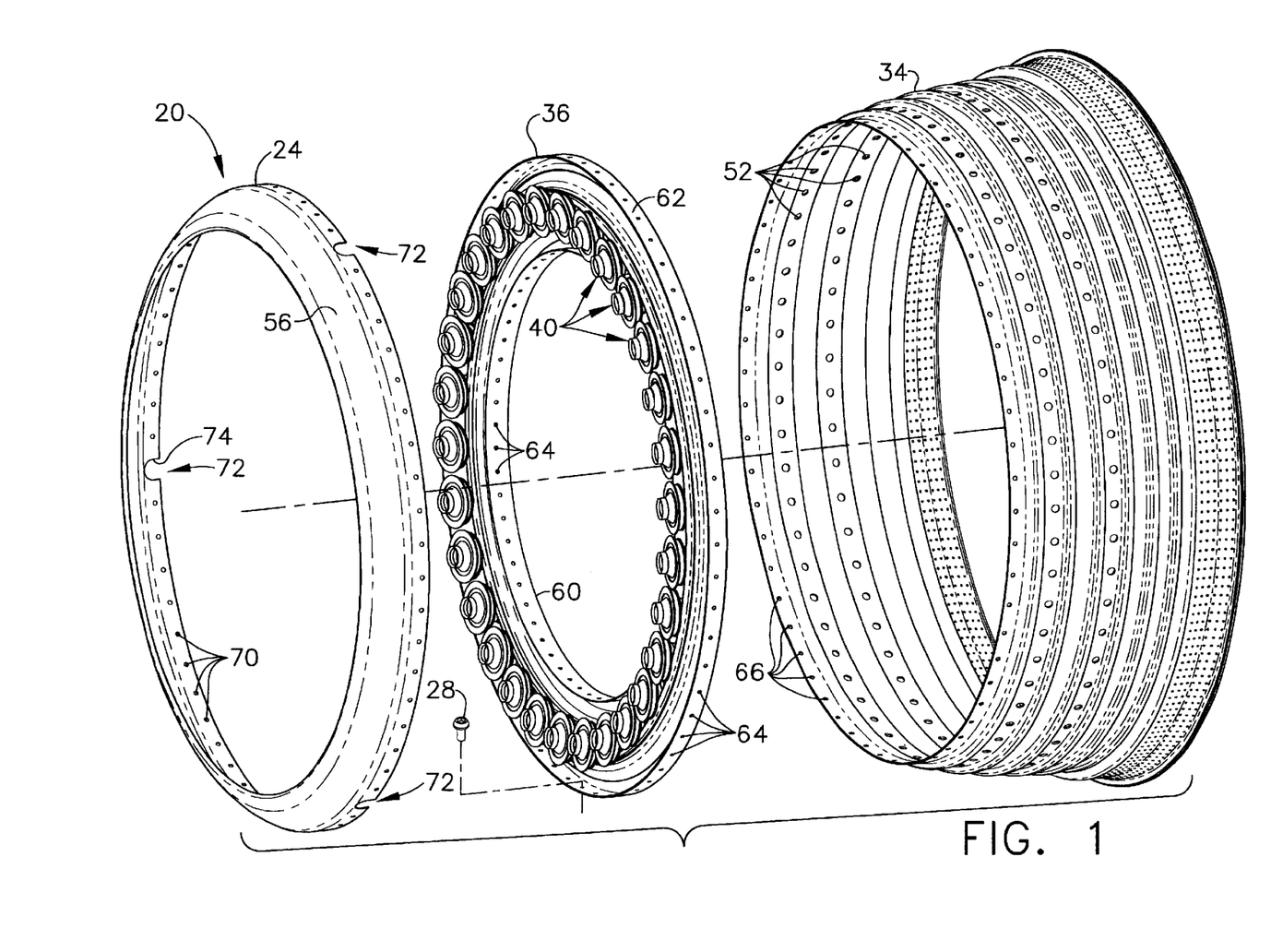
FIG. 1 is an exploded perspective view of a portion of an annular combustor assembly according to the present invention for a gas turbine engine, including a radially outer liner, a dome, and an outer cowl.
Figure 2:
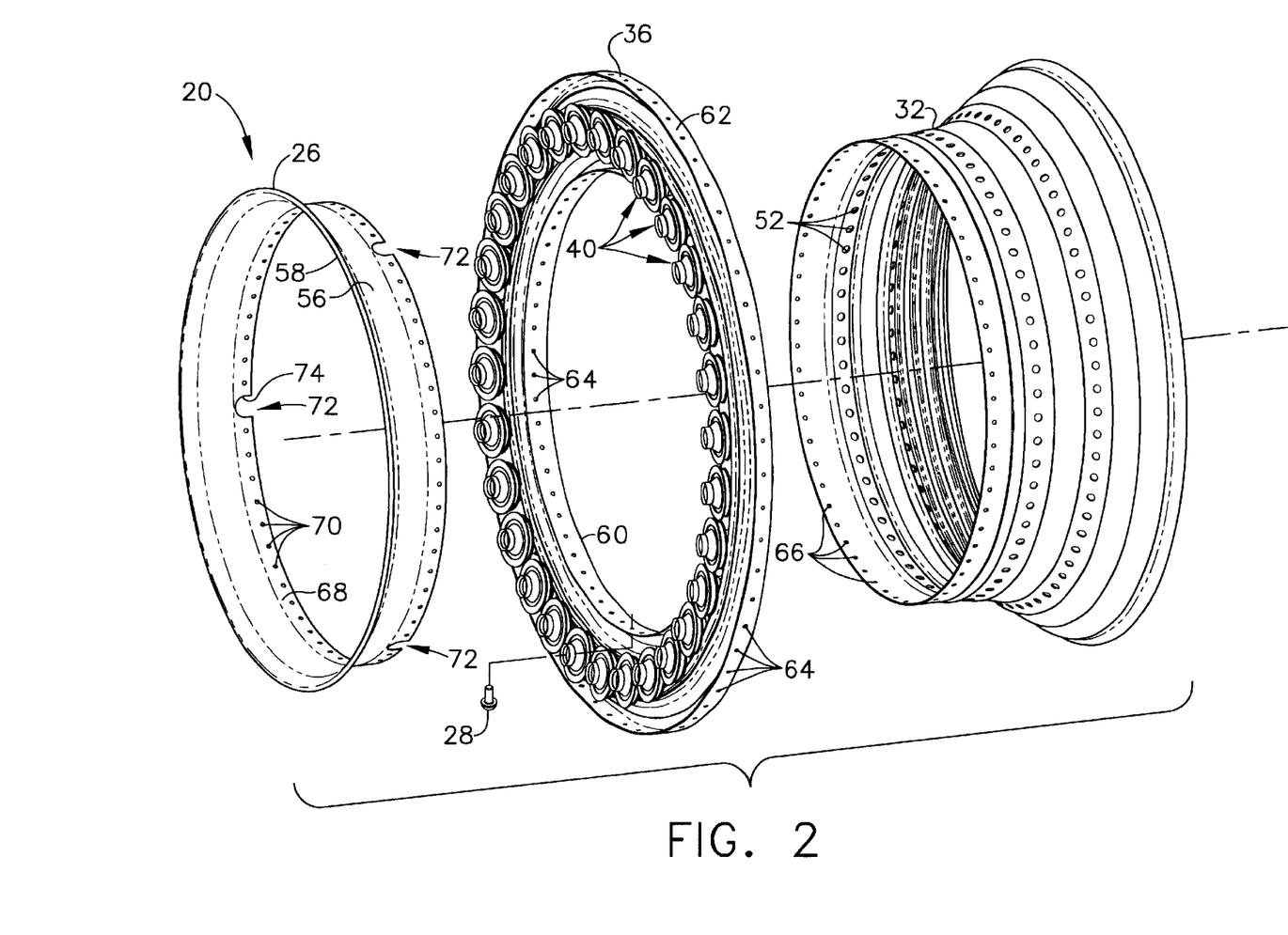
FIG. 2 is an exploded perspective view of a radially inner liner, the dome, and an inner cowl.
Figure 3:
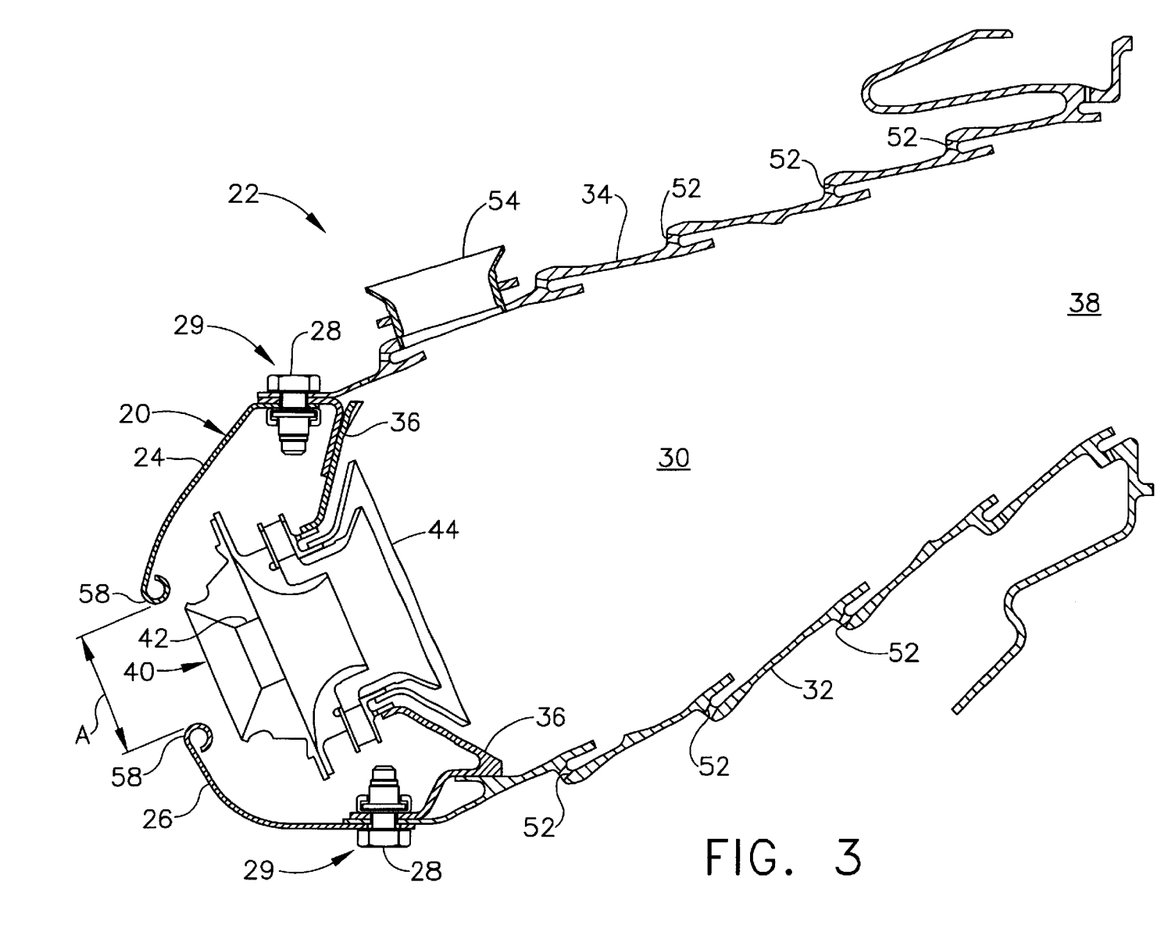
FIG. 3 is a schematic side elevational section of the combustor assembly.

Referring now to the drawings and in particular to FIGS. 1–3, a two-piece cowl of the present invention for a gas turbine engine is indicated generally at 20. The cowl 20 is configured to be removable and replaceable from a combustor assembly 22 of the engine without disassembling the combustor. The cowl 20 includes a radially outer cowl 24 (FIG. 1) and a radially inner cowl 26 (FIG. 2). The outer and inner cowls 24, 26 are separately mounted on the combustor assembly 22 by a plurality of suitable fasteners 28, such as, for example, bolts or rivets.

When assembled, the combustor 22 has an annular, hollow combustion chamber 30 (FIG. 3) bounded by co-annular inner liner 32 and outer liner 34, and an annular structural member 36 interconnecting the upstream ends of the liners. The annular member 36 is known to those skilled in the art and hereinafter referred to as a dome plate or dome. The chamber 30 is open at a downstream end 38 for exit of combustion products to a turbine (not shown). Disposed in the dome 36 is a plurality of circumferentially spaced carbureting devices 40 for providing an atomized fuel/air mixture to the chamber 30. Each carbureting device 40 contains a fuel nozzle 42 and air swirler 44. The fuel nozzle 42 receives fuel from a supply tube (not shown) connected to an upstream end of the nozzle. A suitable means of ignition such as an igniter (not shown) is provided to ignite the mixture in the combustion chamber 30.

The inner and outer liners 32, 34 extend downstream of the dome 36 at radially inner and outer sides, respectively, of the chamber 30. Each liner has a plurality of slot apertures 52 along its length to permit introduction of cooling air along the liner surfaces. The cooling air forms a convective cooling film to protect the liner and downstream turbine from damage due to the very high temperature environment to which they are exposed. A positioning member 54 is located on the outer liner 34 for positioning the combustor 22 relative to other internal parts of the engine or for mounting an igniter.

Flow of pressurized air into the combustor 22 is regulated by the cowl 20 which is attached to the combustor assembly at an operative, mounted position (FIG. 3) upstream of the dome 36. The cowl establishes a high static pressure region immediately upstream of the dome. The outer cowl 24 and inner cowl 26 each have an annular cowl body 56 shaped for guiding flow of air at a minimum pressure loss. Leading edges 58 of the inner and outer cowls are separated by a spacing A (FIG. 3) which defines a "capture area" across the entrance of the dome 36 which is open to flow. The cowl 20 divides the air stream from a diffuser (not shown) into a central stream which enters through the capture area to the carbureting devices 40 and cooling streams which flow outside the cowl, along the outside surface of the outer liner 34 and inside surface of the inner liner 32. The leading edge 58 of each cowl typically is shaped to minimize air flow separation and total pressure losses.

Because the operational features of the combustor 22 are conventional, they will not be described in further detail.

As shown in FIGS. 1 and 2, the dome 36 has radially inner and radially outer bands formed by inner and outer rim flanges 60, 62 respectively. Each rim flange 60, 62 has a row of circumferentially spaced first fastener holes 64 therein. Preferably, there are between twenty and sixty first fastener holes 64 in each row, depending on the size of the dome. The inner and outer liners 32, 34 each have a corresponding row of circumferentially spaced second fastener holes 66 which are generally alignable with the first fastener holes 64 in a respective flange 60, 62, forming pairs of first and second holes. The aligned pairs are configured for receiving a plurality of fasteners 28, forming joints 29 attaching the dome 36, inner liner 32, and outer liner 34 in an assembled condition. Relative angles and spacing between the dome 36 and the inner and outer liners 32, 34 are critical parameters that must be tightly controlled. Accordingly, when the combustor 22 is initially assembled, special tooling (not shown) is required to ensure precise placement of the air swirlers 44 and proper relative positioning between the dome and liners.

The outer cowl 24 and inner cowl 26 each have a mounting band, or rim 68, for attaching the cowl to the combustor assembly 22 at the operative position wherein the cowl body 56 extends upstream of the dome 36. Each mounting rim 68 is positioned generally along a downstream end of the cowl body 56, and it has a plurality of circumferentially spaced third fastener holes 70. The third fastener holes 70 generally correspond with the aligned pairs of first and second holes 64, 66 and are alignable with the first and second holes when the cowl is positioned at the operative position shown in FIG. 3. The first, second, and third fastener holes 64, 66, 70 have approximately equal diameters in order to receive common fasteners 28 simultaneously therethrough. The mounting rim 68 of each cowl 24, 26 is preferably integral with the cowl body 56 and can have corrugations to enhance engagement with corresponding surfaces of the combustor assembly 22. It is understood that a cowl with a different mounting rim does not depart from the scope of the invention. Each cowl 24, 26 is preferably formed in one piece in an investment casting method.

At least one notch, indicated generally at 72, is formed in the mounting rim 68 of each cowl 24, 26 for permitting the cowl to be installed or removed without disassembling the combustor 22. Preferably there are three notches 72 in each cowl. Each notch 72 has an edge 74 defining the notch and an open mouth facing toward the downstream end of the cowl body 56 with a generally crescent or U-shape. Notches of other configuration do not depart from the scope of this invention. Each notch 72 has a size which is larger than a third fastener hole 70 and larger than the maximum diameter D (FIG. 4) of one fastener 28, such that when the cowl is at the operative position, the edge 74 of the notch is spaced outwardly from the corresponding pair of aligned first and second fastener holes 64, 66 and corresponding fastener. As a result, the cowl body 56 may be freely moved to or from the mounted position, while the fastener 28 remains in position attaching the dome 36 and one of the liners 32, 34. The cowl 20 may be installed or replaced while the combustor 22 remains assembled because the installed fastener 28 does not interfere with movement of the cowl.

In one embodiment, each cowl 24, 26 has three notches 72 which are substantially equally spaced about a circumference of the mounting rim 68. That permits a corresponding number of fasteners 28 (three in this embodiment) to be retained in the combustor assembly 22 when the cowl is removed. Three fasteners are effective in preventing any instability or relative motion between the dome 36 and one of the liners 32, 34. However, it is understood that a cowl 20 having one notch 72 or any number of notches does not depart from the scope of this invention.

Figure 4:
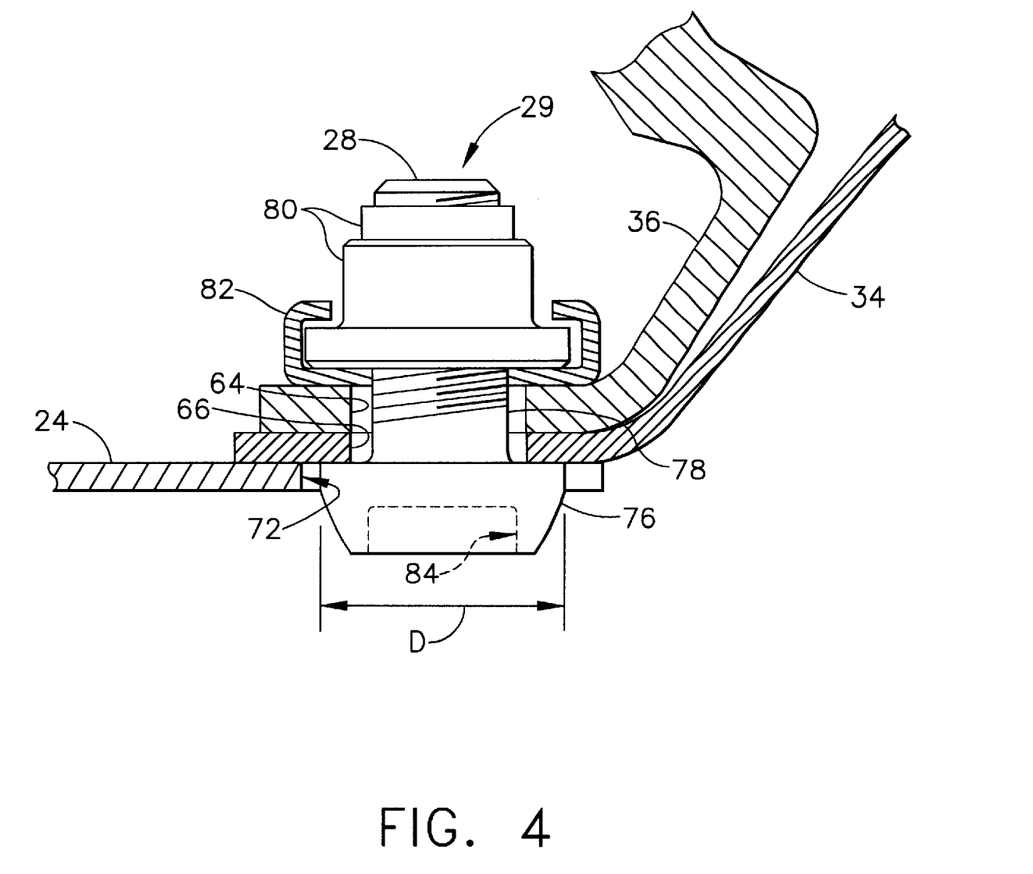
FIG. 4 is a detail of a fastener joint of FIG. 3.

Referring now to FIG. 4, a joint 29 for attaching the dome 36, outer liner 34, and outer cowl 24 is shown in detail. Other joints, such as those connecting the inner liner 32, dome 36, and inner cowl 32 are generally similar, although the radial sequence of joined components may be reversed (i.e., liner at radial outermost position and cowl at innermost position). Additionally, the fastener 28 is shown as a bolt but is not limited to this type of fastener. The bolt shown in FIG. 4 has a head 76 and a shank 78 which extend through the aligned pair of the first and second fastener holes 64, 66 in the dome and liner, respectively. The bolt 28 is held in place by an internally threaded locking nut 80 or nut in a nut plate 82. Typically, the head 76 of the bolt has a recess 84 therein for receiving a suitable tool (e.g., an Allen wrench). The joint 29 of FIG. 4 has the cowl 24 installed with a notch 72 positioned at the bolt 28, such that the bolt head 76 engages the liner 34 and the shank 78 extends only through first and second fastener holes 64, 66. If the cowl was installed with an enclosed third fastener hole 70 positioned at this joint instead of an open notch 72, the bolt head 76 would engage the cowl 24 and the bolt shank 78 would extend through first, second, and third fastener holes 64, 66, 70.

In operation, each cowl 20 may be removed from the combustor assembly 22 while the combustor remains assembled. First, a first set of bolt fasteners 28 is removed, the first set comprising those bolts that commonly and simultaneously extending through aligned fastener holes 64, 66, and 70 in the cowl, dome, and one of the liners, respectively. For example, with combustors having thirty circumferentially spaced fastener holes and a cowl with three notches, the first set of fasteners will comprise twenty-seven bolts 28. A second set of fasteners, corresponding to the notches 72 and extending only through aligned fastener holes 64, 66 in the dome and the liner, are left in place. The cowl 20 may then be separated from the combustor assembly 22 while the second set of fasteners continue to hold the dome and liner in the assembled condition. A repaired or replacement cowl 20 may then be installed by placing the cowl in the aforesaid operative position on the combustor 22 with the three notches 72 arranged around the second set of bolt fasteners 28. The first set of bolts 28 is then re-installed.

Thus the present invention permits cowl replacement at any location without a full teardown of the combustor 22, which reduces time and cost for maintenance and repair. Further, the present invention eliminates the need for special tooling to precisely position the dome 36 and liners 32, 34 when changing cowls, thereby permitting cowl replacement at locations where special tools are unavailable. Also, maintenance or inspection of the forward side of the dome 36 and air swirlers 44 may be performed more economically, without a full combustor teardown.

Figure 5:
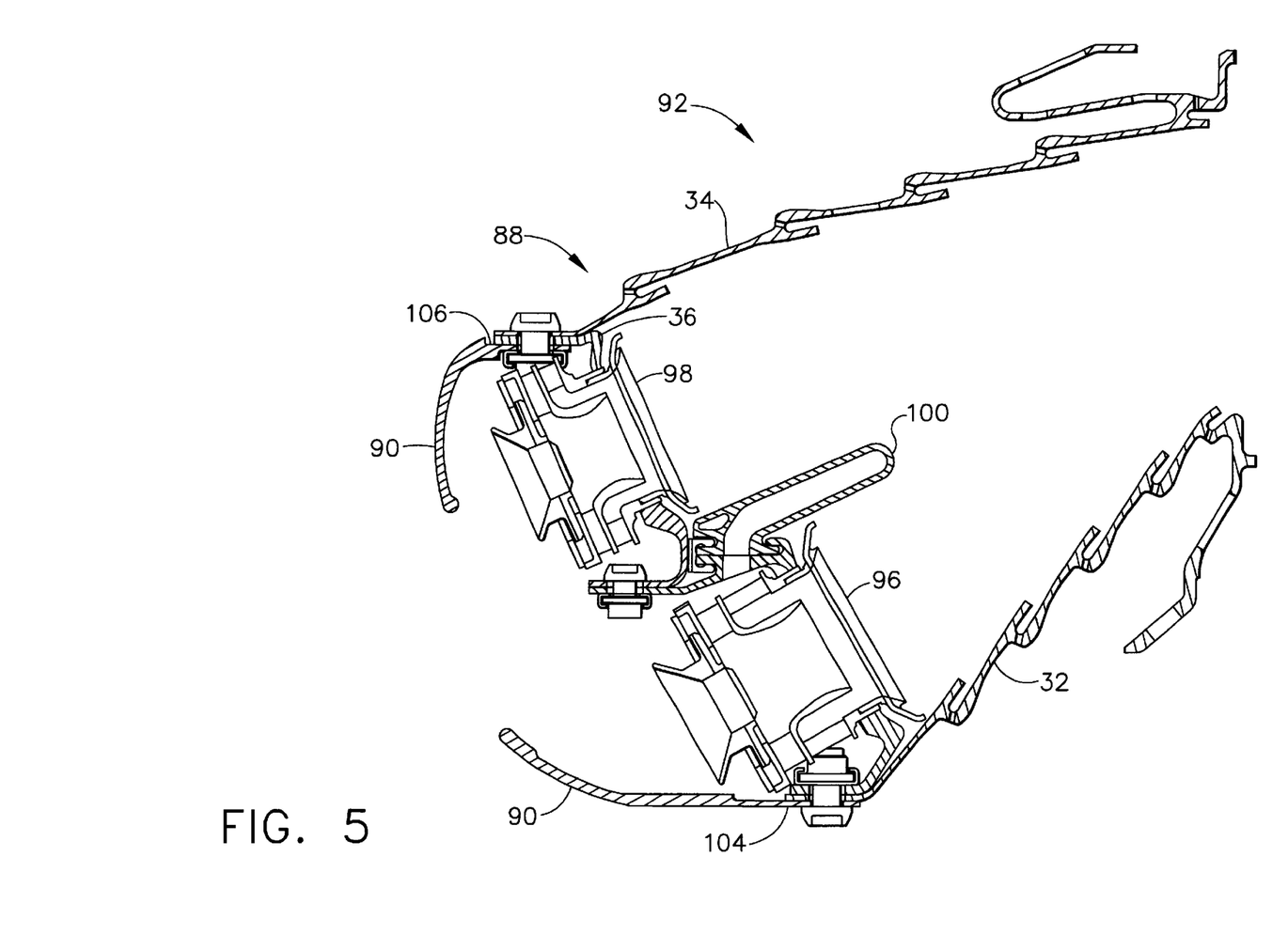
FIG. 5 is a schematic side elevational section of a second embodiment of the invention having a single piece cowl.
Figure 6:
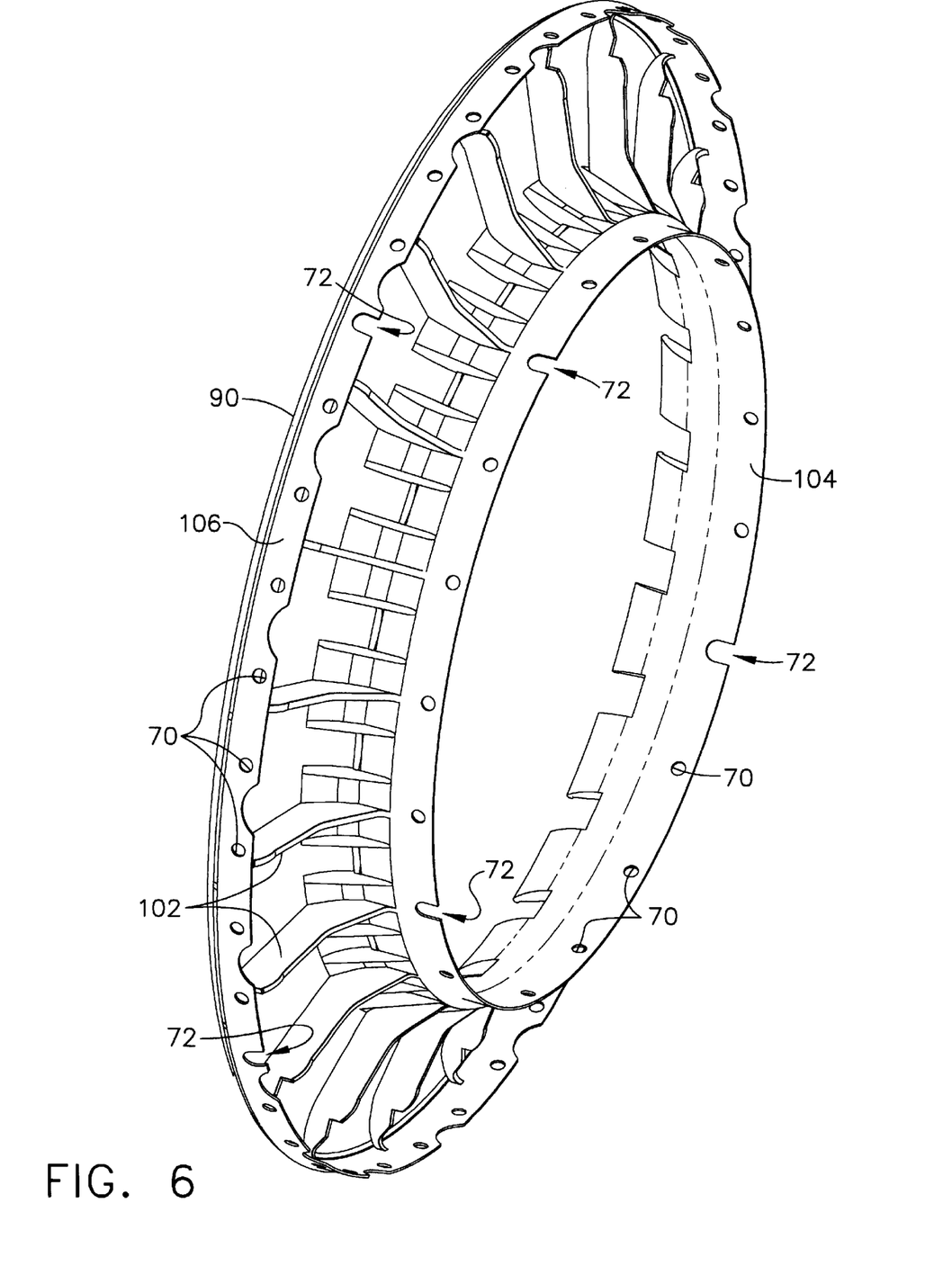
FIG. 6 is a perspective view of the cowl of the second embodiment of FIG. 5.

A second embodiment 88 of the present invention, shown in FIGS. 5 and 6, includes a single-piece, structural cowl 90 on a combustor 92 with a dome having a relatively larger radial dimension, or height. The combustor 92 shown in this embodiment has a double-annular configuration with two separate, radially spaced annular rings of air fuel swirler assemblies 96 and 98, which act somewhat independently during various phases of engine operation. A centerbody 100 extends between the two rings.

The cowl 90 of the second embodiment 88 is preferably formed in one piece by a fabrication or investment casting method. It has an inner mounting rim 104 for attachment to a radially inner side of the combustor 92 and an outer mounting rim 106 for attachment to a radially outer side of the combustor. The cowl 90 has structural ribs 102 which connect the inner and outer mounting rims, enhancing the structural stability of the combustor. At least one notch 72 is formed in each of the mounting rims 104 and 106, and preferably three notches substantially equally spaced about each rim. The cowl 90 can be removed while leaving six fasteners 28 in place; three fasteners connecting the dome 36 and inner liner 32 and three fasteners connecting the dome and outer liner 34. It is understood that the cowl 90 could have only one notch 72 on one mounting rim 104 or 106 or any number and arrangement of notches on the two mounting rims without departing from the scope of this invention.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A cowl for directing flow of air entering a combustor of a gas turbine engine and which is removable from the combustor without disassembling the combustor, the combustor having an annular, hollow chamber defined by an annular dome at an upstream end of the chamber, an inner liner extending downstream of the dome at a radially inner side of the chamber, an outer liner extending downstream of the dome at a radially outer side of the chamber, and a plurality of fasteners for attaching the dome, inner liner, and outer liner in an assembled condition, the dome having a plurality of circumferentially spaced first fastener holes, and the inner and outer liner each having a plurality of circumferentially spaced second fastener holes generally alignable with the first fastener holes forming pairs of first and second holes for receiving said fasteners, the cowl comprising:

an annular cowl body for guiding flow of air entering the combustor;

a mounting rim on the cowl body for attaching the cowl to the combustor in an operative position wherein the cowl body extends upstream of the dome, said mounting rim having a plurality of circumferentially spaced third fastener holes generally corresponding with said pairs of first and second holes, the third fastener holes being alignable with said corresponding pairs in said operative position to receive said fasteners commonly and simultaneously through first, second, and third fastener holes; and at least one notch in the mounting rim having an edge defining the notch and an open mouth, said at least one notch being sized larger than a third fastener hole and being configured such that when the cowl is in said operative position, the notch is aligned with a corresponding pair of first and second fastener holes with the edge of the notch spaced outwardly from said holes such that one of said fasteners is receivable in said pair of first and second holes without engaging the mounting rim, said at least one notch allowing the cowl to be installed on or removed from said operative position while the dome, inner liner, and outer liner are held in said assembled condition.

2. A cowl as set forth in claim 1 wherein there are a plurality of notches in the mounting rim.

3. A cowl as set forth in claim 2 wherein said plurality of notches are equally spaced about a circumference of the mounting rim.

4. A cowl as set forth in claim 3 wherein said mounting rim is positioned generally along a downstream end of the cowl body.

5. A cowl as set forth in claim 4 wherein the mouth of each of said notches opens toward said downstream end of the cowl body.

6. A cowl as set forth in claim 5 wherein said notches are generally U-shaped.

7. A cowl as set forth in claim 2 wherein the mounting rim has exactly three notches.

8. A cowl as set forth in claim 1 wherein said mounting rim is integral with the cowl body.

9. A cowl as set forth in claim 1 wherein said cowl body comprises an outer cowl body attachable to a radially outer side of the combustor and further comprising an inner cowl body attachable to a radially inner side of the combustor.

10. A cowl as set forth in claim 1 wherein said mounting rim comprises an inner mounting rim for attachment to a radially inner side of the combustor and the cowl further comprises an outer mounting rim for attachment to a radially outer side of the combustor.

11. A cowl as set forth in claim 10 wherein said outer mounting rim has at least one notch.

12. A cowl as set forth in claim 1 in combination with said fasteners.

13. A cowl as set forth in claim 12 wherein said fasteners have a size defined by a maximum diameter and said at least one notch has a size greater than said maximum diameter so that said notch may fit around one of said fasteners in spaced relation therefrom at said operative position without engaging said one fastener.

14. A combustor assembly for a gas turbine engine, the combustor comprising:

a hollow combustion chamber generally annular in shape and defined by a forward annular dome and a liner downstream of the dome;

a plurality of fasteners extending through aligned holes in the dome and liner for connecting the dome and liner at circumferentially spaced locations;

a cowl body having a generally uniform annular shape and being mountable on the dome and liner at a mounted position, the cowl body having a plurality of circumferentially spaced fastener holes extending therethrough generally corresponding to said aligned holes in the dome and liner for receiving said fasteners to connect the cowl body to the dome and liner; and at least one notch in the cowl body sized sufficiently larger than a corresponding at least one fastener to permit said cowl body to be moved to or removed from said mounted position while said at least one corresponding fastener remains in position for connecting the dome and liner to one another.

15. A combustor assembly as set forth in claim 14 wherein said liner of the combustion chamber further comprises radially spaced inner and outer liners.

16. A combustor assembly as set forth in claim 15 wherein the cowl body has three notches which are spaced about a circumference of the mounting rim.

17. A combustor assembly as set forth in claim 16 wherein each of said notches is open toward a downstream end of the cowl body.

18. A method of removing a cowl from a combustor assembly of a gas turbine engine while the combustor remains assembled, the combustor having an annular, hollow chamber defined by a dome at an upstream end of the chamber, an inner liner extending downstream of the dome at a radially inner side of the chamber, and an outer liner extending downstream of the dome at a radially outer side of the chamber, the cowl being mountable on the combustor assembly in an operative position for regulating flow of air entering the chamber with a first set of fasteners commonly and simultaneously extending through aligned fastener holes in the cowl, dome, and one of said liners, the combustor assembly having a second set of fasteners extending through aligned fastener holes in the dome and one of said liners and free from engagement with said cowl, said second set of fasteners being generally aligned with notches formed in said cowl, the method comprising the steps of:

removing said first set of fasteners while leaving said second set of fasteners in place;

separating the cowl from the combustor assembly while said second set of fasteners holds the dome and liner connected to one another.

19. A method as set forth in claim 18 further comprising the step of attaching a replacement cowl to the combustor assembly by placing said replacement cowl in said operative position on the combustor assembly and installing said first set of fasteners through aligned fastener holes in the replacement cowl, dome, and one of said liners.

* * * * *